000
United States Patent Office 3,559,404
Patented Feb. 2, 1971

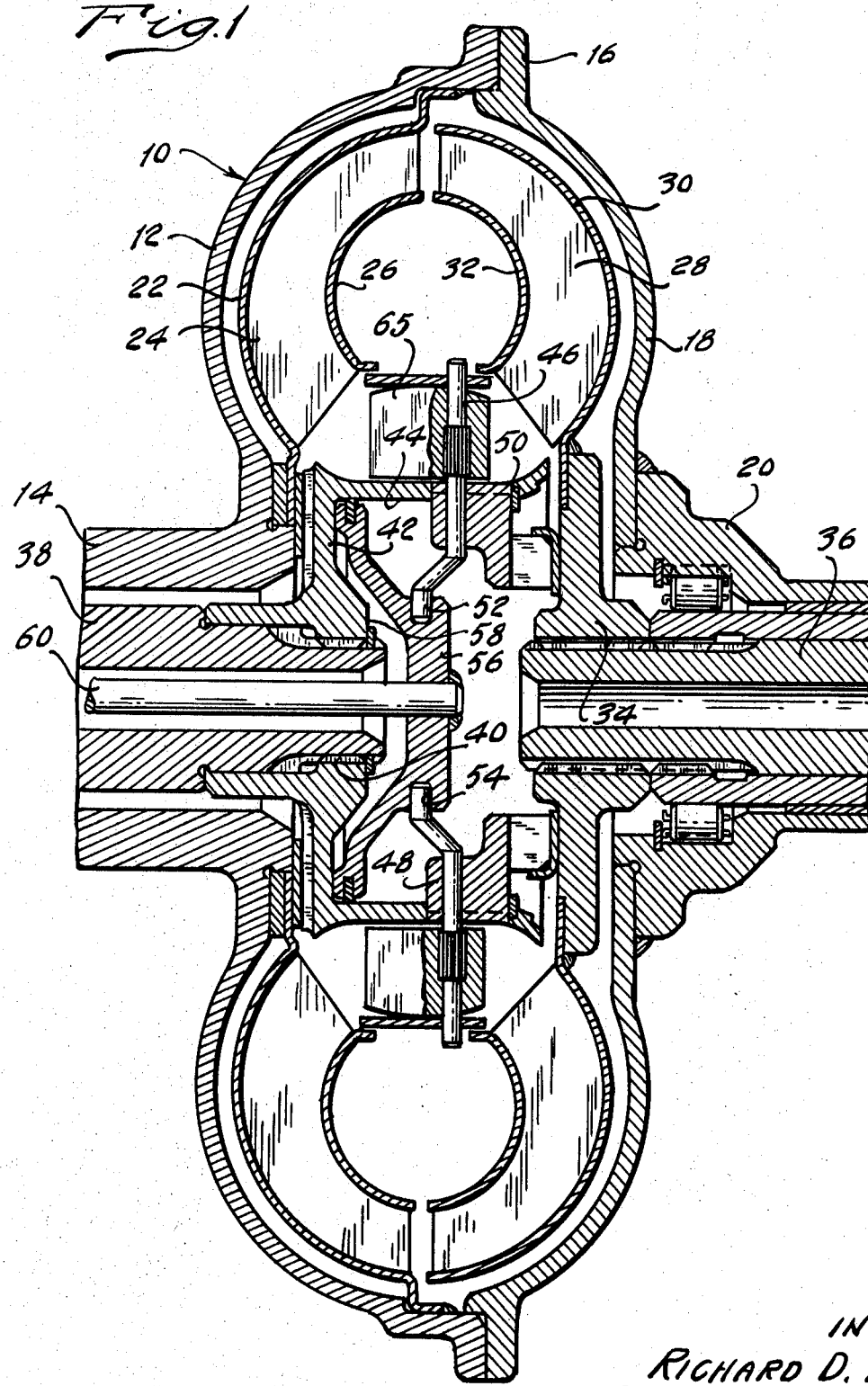

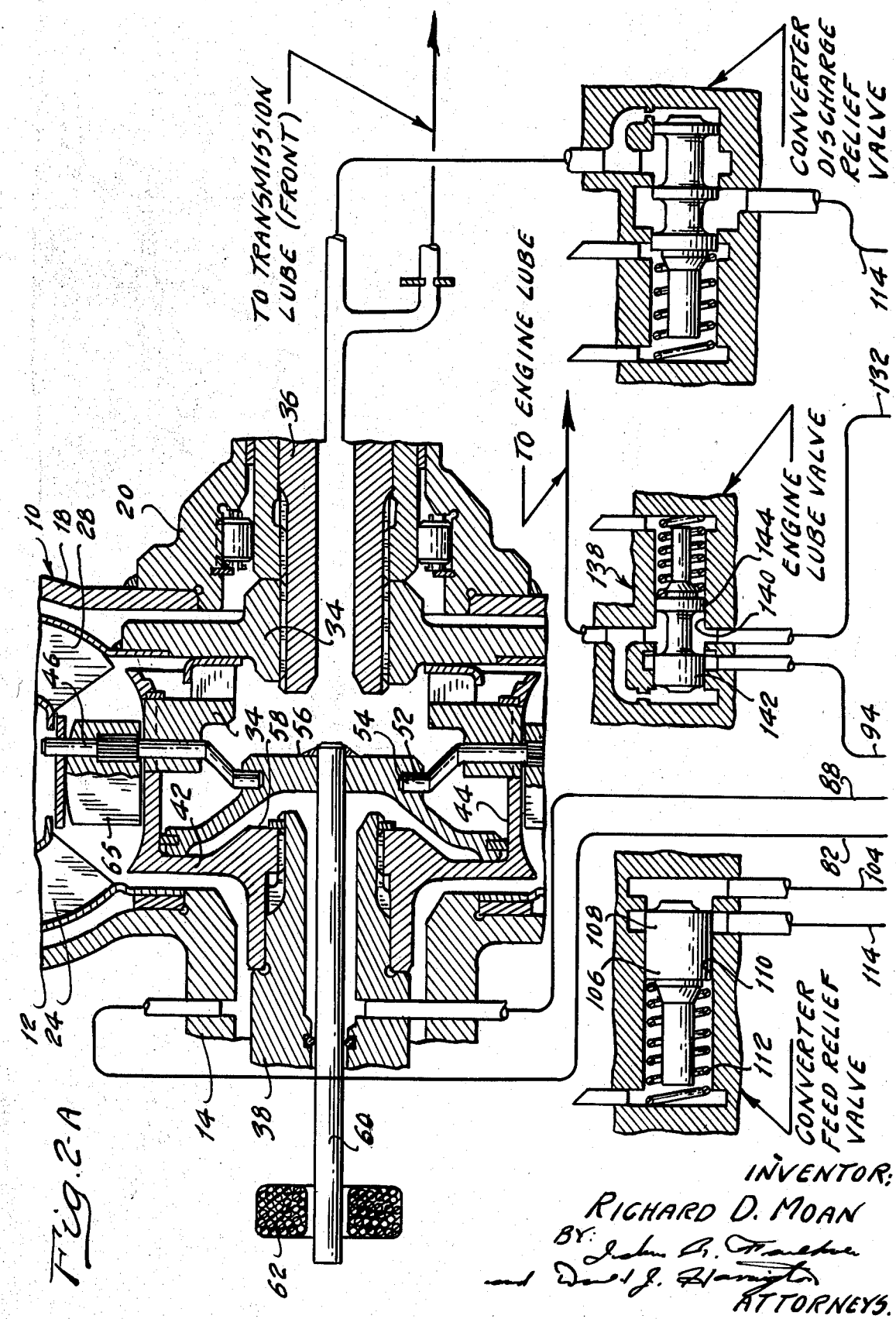

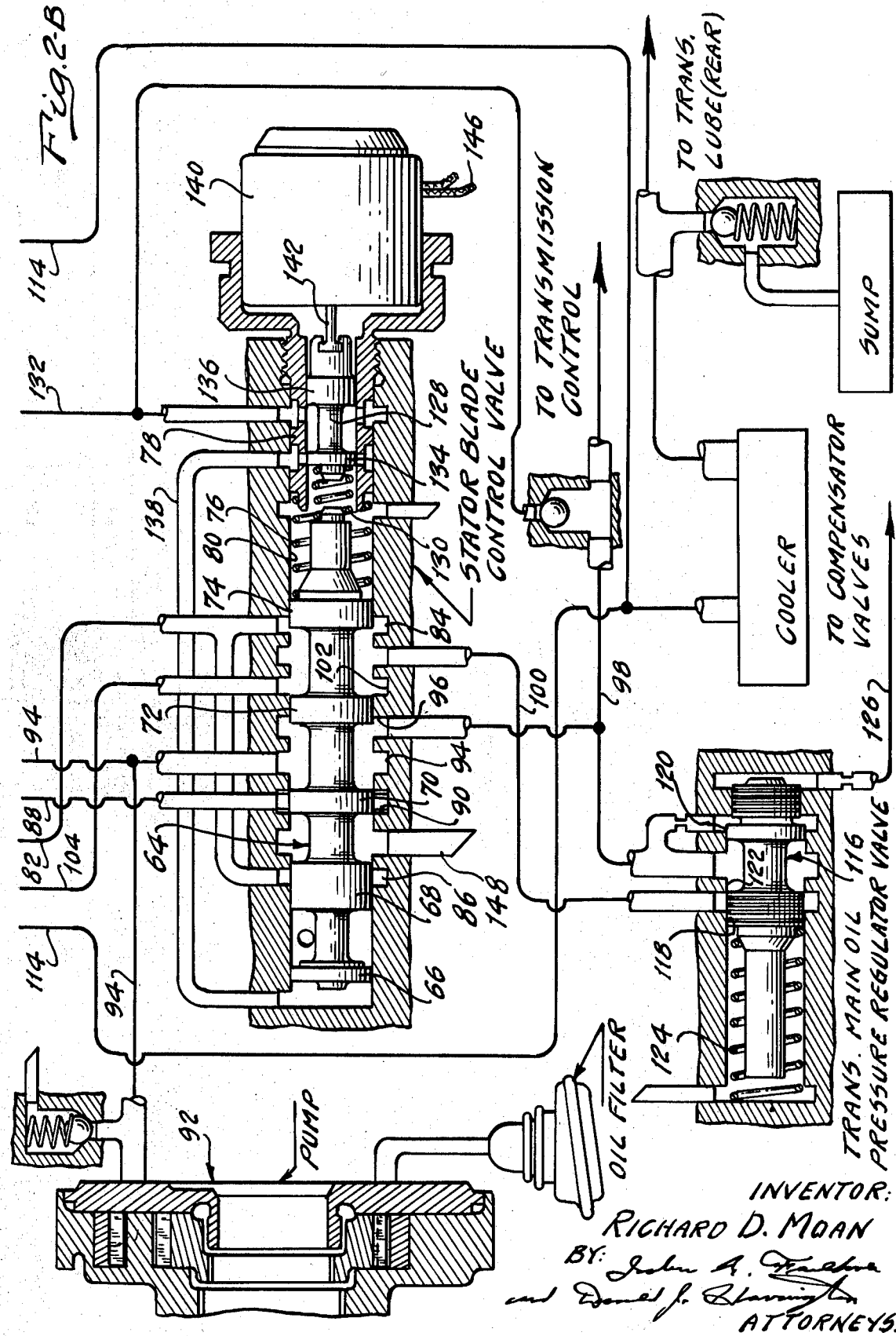

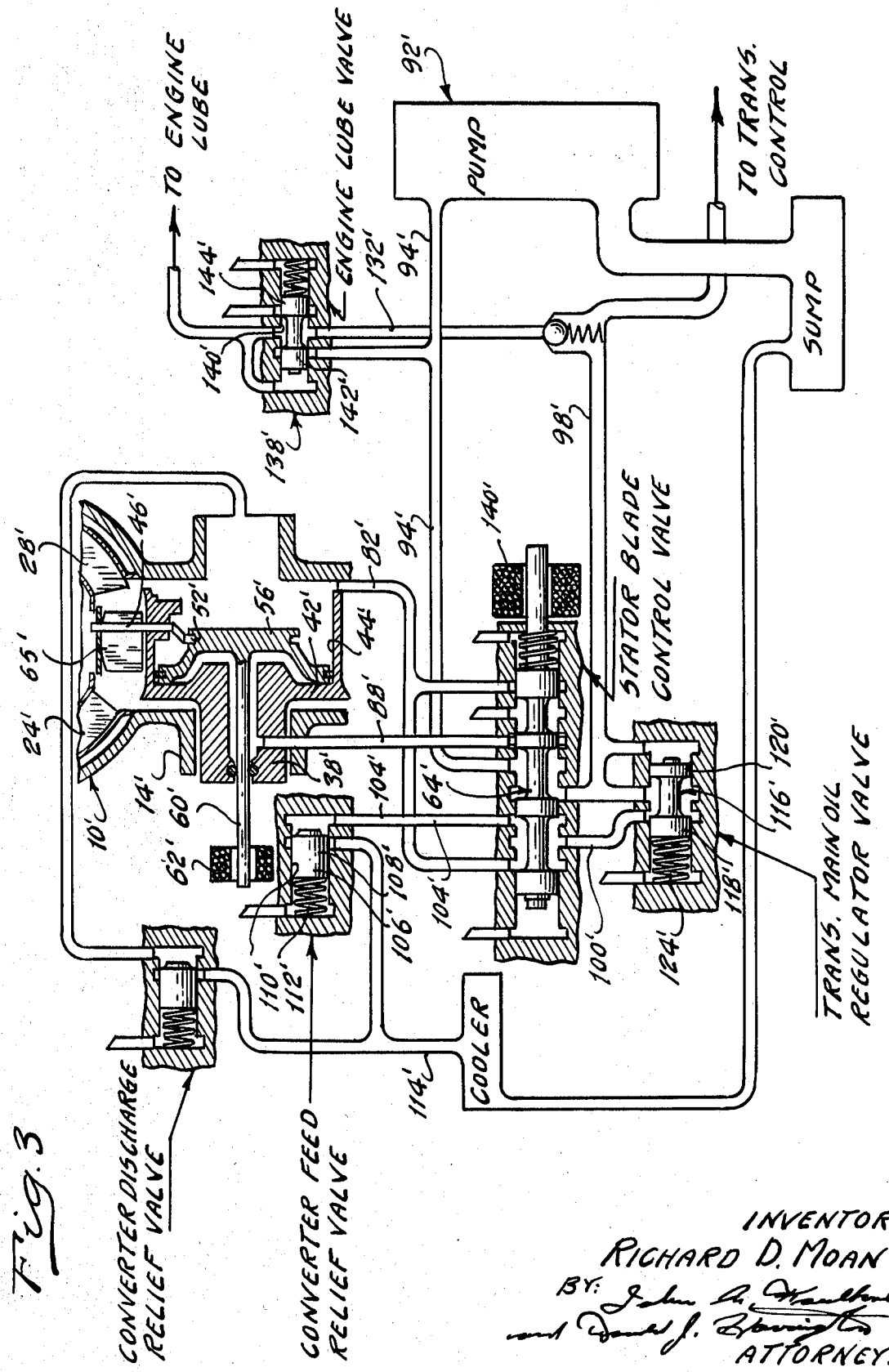

3,559,404
TORQUE CONVERTER STATOR BLADE PITCH CONTROL CIRCUIT
Richard D. Moan, Livonia, Mich., assignor to Ford Motor Company, Dearborn, Mich., a corporation of Delaware
Filed Apr. 15, 1969, Ser. No. 816,287
Int. Cl. F16d 33/04
U.S. Cl. 60—54
4 Claims

ABSTRACT OF THE DISCLOSURE

A hydrokinetic torque converter transmission for a single rotor gas turbine engine, the torque converter comprising a bladed impeller, a bladed stator and a bladed turbine, the stator being held fast against rotation, a servo for adjusting the angularity of the blades of the stator with respect to the converter fluid flow vectors and valve means for actuating the servo to produce an infinitely-variable, hydrokinetic, torque multiplication that tends to maintain a desired torque and speed relationship for the engine.

GENERAL DESCRIPTION OF THE INVENTION

My invention comprises improvements in a hydrokinetic torque converter transmission for a gas turbine power plant. Provision is made for varying the converter characteristics to compensate for the generally unfavorable torque and speed relationship of the power plant. In a single-rotor, gas turbine power plant for automotive vehicles, it is desirable to maintain a given speed range within narrow limits because of the wide variation in torque that would result if speed variations were extreme.

The operator of the vehicle calls for a given power demand by advancing the engine accelerator pedal. That power level is achieved when the turbine engine speed reaches its design speed. At that time the operating temperature of the engine automatically assumes its predetermined operating value, which usually is the highest value that can be accommodated by the materials with which the engine is made.

For any given power demand of the operator, which is indicated by advancing the accelerator foot pedal, the operating temperature and speed should be allowed to stabilize at their respective design levels. To assure this, an appropriate temperature signal and an appropriate speed signal, together with a signal that reflects the position of the accelerator pedal, is introduced into the control system for the hydrokinetic torque converter. Any deviation in the magnitude of one or more of those signals from its proper design limit will cause a response in the control system that will effect an adjustment of the hydrokinetic torque converter stator blade angles. This in turn alters the size factor of the hydrokinetic unit, which results in appropriate engine compensations.

Changes in the hydrokinetic characteristics of the converter effect operating parameters of the turbine engine itself. Changes in the angle of the stator of the hydrokinetic converter, therefore, produce changes in the signals related to that angular position so that a steady-state condition again is restored with the engine operating at its proper power level.

Because of the characteristics of a turbine engine and the requirement that the turbine engine always be subjected to torque to prevent a so-called run-away-condition, the converter usually is not required to operate in a so-called coupling mode. The entire operating range of the converter can be carried out in its torque multiplication mode as distinct from its coupling mode. This, therefore, eliminates the need for providing a freewheeling condition for the stator.

The improvements of my invention are concerned principally with a control system and a converter in an environment of the type described in the foregoing paragraphs.

BRIEF DESCRIPTION OF THE FIGURES OF THE DRAWINGS

FIG. 1 shows a hydrokinetic torque converter adapted to be used in a gas turbine power plant.

FIGS. 2A and 2B show a schematic diagram for controlling the movable stator of the converter shown in FIG. 1.

FIG. 3 is a modification of the circuit of FIG. 2.

PARTICULAR DESCRIPTION OF THE INVENTION

In FIG. 1, numeral 10 designates generally a hydrokinetic torque converter for use in the driveline of a single rotor gas turbine power plant. It comprises an impeller shell 12 connected to a power input shaft 14, which in turn can be connected to the power turbine of a gas turbine engine. The impeller shell is formed in two parts, which are joined together at the periphery of the torque converter as shown at 16. One shell part, which is shown at 18, extends radially inwardly and is connected to an impeller hub 20. This in turn is joined by means of a bearing support or a relatively stationary housing, not shown.

The shell 12 encloses an impeller shroud 22 to which is secured impeller blades 24. These blades, together with the shroud 22 and cooperating inner shroud 26, define radial outflow passages for the converter fluid. A turbine also is located within the shell. It includes turbine blades 28 located between a turbine outer shroud 30 and a turbine inner shroud 32. Shroud 30 is secured to a turbine hub 34 which is splined to power output shaft 36.

A relatively stationary stator shaft 38 is located within the input shaft 14. It is splined at 40 to a stator hub 42, which is centrally apertured to form cylinder 44. Blade shafts 46 extend radially outwardly from the hub 42 through angularly spaced radial openings. The shafts 46 are guided by a retainer ring 48 which is held within the central opening in cylinder 44 and secured axially fast by snap ring 50.

The radially inward end of each shaft 46 is offset to form a crank 52. These ends are received within an annular groove 54 formed in piston 56. The cylinder 44 slidably receives the piston 56 and cooperates therewith to define a pressure chamber 58. A shaft 60 on piston 56 extends through the stator shaft 38. It is received within an opening formed in solenoid 62, which acts as a position sensor for the piston 56.

Each shaft 46 carries a separate stator blade 65. The blades can be moved between a relatively closed position and a relatively open position as the shafts 46 are rotated. When the piston 56 is moved in a left-hand direction, the blades 65 assume an open position, thereby offering a minimum resistance to the toroidal fluid flow and changing the direction of the toroidal fluid flow vectors a minimum amount. When the piston 56 moves in a right-hand direction, the blade 65 assumes a relatively closed position. At that time the angularity of the toroidal fluid flow vectors are altered to produce a relatively large tangential velocity component.

The pressure in the torus circuit acts upon the right-hand side of the piston 56. This is opposed by the pressure in the chamber 58.

A stator blade control valve is designated generally by reference character 64. Valve 64 comprises a spool having lands 66, 68, 70, 72 and 74. The valve is urged in a left-hand direction by valve spring 76 which is seated on the left-hand end of a valve sleeve 78. The sleeve 78 is fixed within valve chamber 80, within which the valve spool is adapted to move.

A passage 82 extends from the torus circuit of the converter and from the right-hand side of piston 56 to valve chamber 80. It intersects valve chamber 80 adjacent lands 74 and 68 where ports 84 and 86, respectively, are located. Passage 88 communicates with the left-hand side of the piston 56. Pressure chamber 58 is connected to the valve chamber 80 at port 90.

An engine driven pump 92 creates a circuit pressure in pump feed passage 94. This passage communicates with valve chamber 80 at port 94, which is located intermediate lands 70 and 72. Land 72 controls communication between passage 94 and port 96, which in turn communicates with passage 98 extending to the transmission control system, which in turn controls multiple ratio clutches and brakes for the automatic transmission planetary gearing, not shown.

Communication between passage 100 and each of the ports 84 and 102 in the chamber 80 is controlled by lands 74 and 72, respectively. Port 102 communicates with passage 104, which extends to the converter feed relief valve 106, which has a single land valve spool 108 slidably situated in chamber 110. Valve spool 108 is urged in a right-hand direction, as viewed in FIG. 2, by valve spring 112. Spool 108 establishes controlled communication between passages 104 and exhaust passage 114 extending to the transmission cooler.

Passage 100 extends to transmission main oil pressure regulator valve 116, which comprises a valve spool having spaced valve lands 118 and 120 slidably situated in valve chamber 122. Vale spool 116 is urged in a right-hand direction by valve spring 124. Lands 118 and 120 provide controlled communication between passage 100 and passage 98 which extends from the transmission control system. An auxiliary compensator pressure can be applied to the end of valve spool through compensator pressure passage 126. The regulating characteristics of valve 116 thus can be controlled as the torque and speed requirements of the transmission system change.

A pilot valve 128 is situated slidably within the sleeve 78. A valve spring 130 separates pilot valve 128 from main valve spool 64.

Passage 132 communicates with valve sleeve 78 and with the space between valve lands 134 and 136 of valve spool 128. This passage 132 extends to an engine lube valve 138, which receives main line pressure from passage 94. Valve 138 comprises a valve spool situated slidably in valve chamber 140. Lands 142 and 144 for the valve 138 control communication between passage 94 and passage 132, thereby providing a modified, lower lube pressure in passage 132. Lands 136 and 134 control the degree of communication between passage 132 and outward passage 138 for the pilot valve. This passage 138 extends to the left-hand side of the valve land 136. Operation of valve 128 is controlled by an electrical coil 140. The coil 140 is a part of a solenoid, which includes also an actuator or armature 142 mechanically connected to the valve 128.

An electrical control signal is received by the coil 140 through leads 146. The signal is the summation of various signals that are functionally related to engine variables such as temperature, converter speed and output torque. The signal received by the coil 140 is determined also in part by the position of the piston 56, which is sensed by the coil 62.

During operation the pump 92 supplies fluid pressure to the port 94, which normally is in communication with port 96 so that the transmission control system can be supplied through passage 98. The pressure level is maintained by the regulator valve 116 as explained previously. All oil not flowing to the transmission system is distributed through passage 100 to the valve chamber 80. It then flows through the passage 82 to the torus circuit for the converter, thereby maintaining a control pressure in the torus circuit. That pressure urges the piston 56 in a left-hand direction. Its magnitude is maintained by the relief valve 108.

When the valve 64 is moved to the left in response to a change in a control signal made available to the coil 140, which movement is accompanied by a reduction in the pressure in passage 138, pump pressure is routed through port 90 to the left side of piston 56 thereby tending to move the piston 56 in a right-hand direction to close the stator blades. As the valve 64 is moved to an extreme left-hand position, port 96 becomes closed, thereby sending all of the pump discharge fluid, except that required by the engine lubricating system, to the piston 56. It also vents the converter torus circuit through ports 86 and through exhaust port 148. The converter inlet port 84 is closed at that time, thereby causing the piston 56 to move to the right as fast as possible.

When valve 64 is moved to the right, port 90 is vented permitting converter charge pressure to force the piston 56 to the left, thus opening the stator blades. At the extreme right-hand position of the valve, port 102 is blocked causing converter charge pressure to increase and to move the piston 56 faster. An electronic control system will sense the actual blade position with the coil 62, which in turn is used as a control signal with control signals related to engine parameters. The signals are summed and received by the coil 140. This in turn causes the valve 128 to be displaced in the left-hand direction causing lube pressure to be distributed to the left-hand side of the valve 64. Valve 64 then moves to the right, thereby affecting the force of the spring 130 and tending to restore the valve 128 to its former neutral position. When the valve 128 is moved in the other direction, the pressure force acting on the left-hand side of the valve 64 is decreased and appropriate compensation takes place in the force of the spring 130. Again the valve 128 is caused to be restored to the neutral position.

An alternate embodiment is shown in FIG. 3. The valve 128 and its hydraulic connection with the valve 64 is eliminated. In this instance the coil 140 acts directly on the valve 64, thereby causing a direct response of the valve 64 to changes in the engine parameters. Because of the similarity in the control systems of FIG. 3 and FIGS. 2A and 2B identical reference characters are used, although prime notations are added to the reference characters of FIG. 3.

Having thus described preferred embodiments of my invention, what I claim and desire to secure by U.S. Letters Patent is:

1. In a hydrokinetic torque converter transmission mechanism for use in a torque delivery driveline for delivering driving torque from a powerplant, a bladed impeller, a bladed turbine and a bladed stator situated in a torus circuit in toroidal fluid flow relationship, said stator being located between the torus flow outlet region of the turbine and the torus flow inlet region of the impeller, a stator hub, a movable piston in said hub, said piston and said hub cooperating to define a pressure chamber on one side of the piston, blade shafts in said hub, each shaft having a stator blade carried thereon, said blades being angularly adjusted upon rotation of said shafts, a mechanical connection between said shafts and said piston whereby movement of said piston in said hub causes rotation of said blades, a pressure source, a control circuit establishing a fluid connection between said pressure source and said converter including a first passage means extending to said pressure chamber on one side of the piston, the other side of said piston being exposed to torus circuit pressure within said converter, a stator blade control valve situated in said control circuit between said pressure source and said pressure chamber and between said torus circuit and a low pressure region of said mechanism, said stator blade control valve including relatively movable elements adapted to control pressure distribution across said piston, and a control servo for establishing relative movement of said valve elements in response to control variables, said mechanism including a position indicator registering with portions of said movable piston, said indicator establishing one of the variables sensed by said control servo.

2. The combination as set forth in claim 1 wherein said stator hub is held rotatably fast and said stator blades are angularly adjustable about fixed radial axes as said converter mechanism operates only in the torque multiplication mode.

3. The combination set forth in claim 1 wherein said stator blade control valve comprises a main valve element and a pilot valve element, means for biasing said main valve element in one direction, said main valve element being slidably situated in a valve chamber which establishes in part fluid communication between said pressure source and said pressure chamber on one side of the piston and between said torus circuit and a low pressure region, said pilot valve element being connected hydraulically to said main valve element, said pilot valve element being operatively connected to said servo and to said pressure source whereby changes in the variables sensed by said control servo effect a change in the pressure forces acting on said main valve element.

4. The combination set forth in claim 2 wherein said stator blade control valve comprises a main valve element and a pilot valve element, means for biasing said main valve element in one direction, said main valve element being slidably situated in a vale chamber which establishes in part fluid communication between said pressure source and said pressure chamber on one side of the piston and between said torus circuit and a low pressure region, said pilot valve element being connected hydraulically to said main valve element, said pilot valve element being operatively connected to said servo and to said pressure source whereby changes in the variables sensed by said control servo effect a change in the pressure forces acting on said main valve element.

References Cited
UNITED STATES PATENTS

| | | | |
|---|---|---|---|
| 2,924,941 | 2/1960 | Snoy | 60—54 |
| 2,999,400 | 9/1961 | Kelley | 60—54X |
| 3,358,444 | 12/1967 | Tuck | 60—54 |
| 3,425,220 | 2/1969 | Egbert et al. | 60—54 |

EDGAR W. GEOGHEGAN, Primary Examiner